United States Patent
Haller et al.

[11] 3,869,173
[45] Mar. 4, 1975

[54] LINEAR RETRACTOR

[75] Inventors: William P Haller, Milford; Thomas C. Holka, Detroit, both of Mich.

[73] Assignee: Ford Motor Company, Dearborn, Mich.

[22] Filed: Dec. 3, 1973

[21] Appl. No.: 421,380

[52] U.S. Cl. ............ 297/388, 280/150 S B, 297/389
[51] Int. Cl. ............................................. A62b 35/00
[58] Field of Search ........... 297/388, 389, 385, 384, 297/387; 280/150 SB; 242/107 SB

[56] References Cited
UNITED STATES PATENTS

| | | | |
|---|---|---|---|
| 3,419,308 | 12/1968 | Apri | 280/150 SB |
| 3,459,440 | 8/1969 | Hopka et al. | 297/388 X |
| 3,472,552 | 10/1969 | Hopka et al. | 297/388 |
| 3,526,431 | 9/1970 | Boedigheimer et al. | 297/388 |
| 3,535,001 | 10/1970 | Lewis et al. | 297/388 |
| 3,592,507 | 7/1971 | Gionet | 297/388 |
| 3,667,806 | 6/1972 | Specher | 297/388 |

*Primary Examiner*—James T. McCall
*Attorney, Agent, or Firm*—John J. Roethal; Keith L. Zerschling

[57] ABSTRACT

A linear retractor for a shoulder harness segment of a vehicle belt system. The retractor has an elongated housing containing an arresting device supported on a cross shaft engaged with track means on opposite sides of the housing, the cross shaft supporting the arresting device for tilting movement and sliding movement longitudinally of the housing. The shoulder harness segment is anchored at one of its ends to the housing and extends longitudinally within the housing from the anchor means to and around the arresting device cross shaft and exits the housing in proximity to its anchored end.

The housing has a plurality of lateral serrations extending longitudinally thereof. The arresting device has a detent means positioned for engagement with the serrations and when so engaged being effective to hold the arresting device and thereby the belt segment in segment protracting direction. A cam means on the arresting device deflects a section of the segment from a straight line relation between its point of departure from the cross shaft and its point of departure from the housing. Any sudden protraction movement of the segment causes it to be pulled taut and to apply pressure through the cam means to tilt the arresting device into engagement with the housing serrations.

Spring means normally urge the arresting device and segment toward retracted position, the spring means providing minimal resistance to protraction of the segment in serration disengaged position of the arresting device.

9 Claims, 4 Drawing Figures

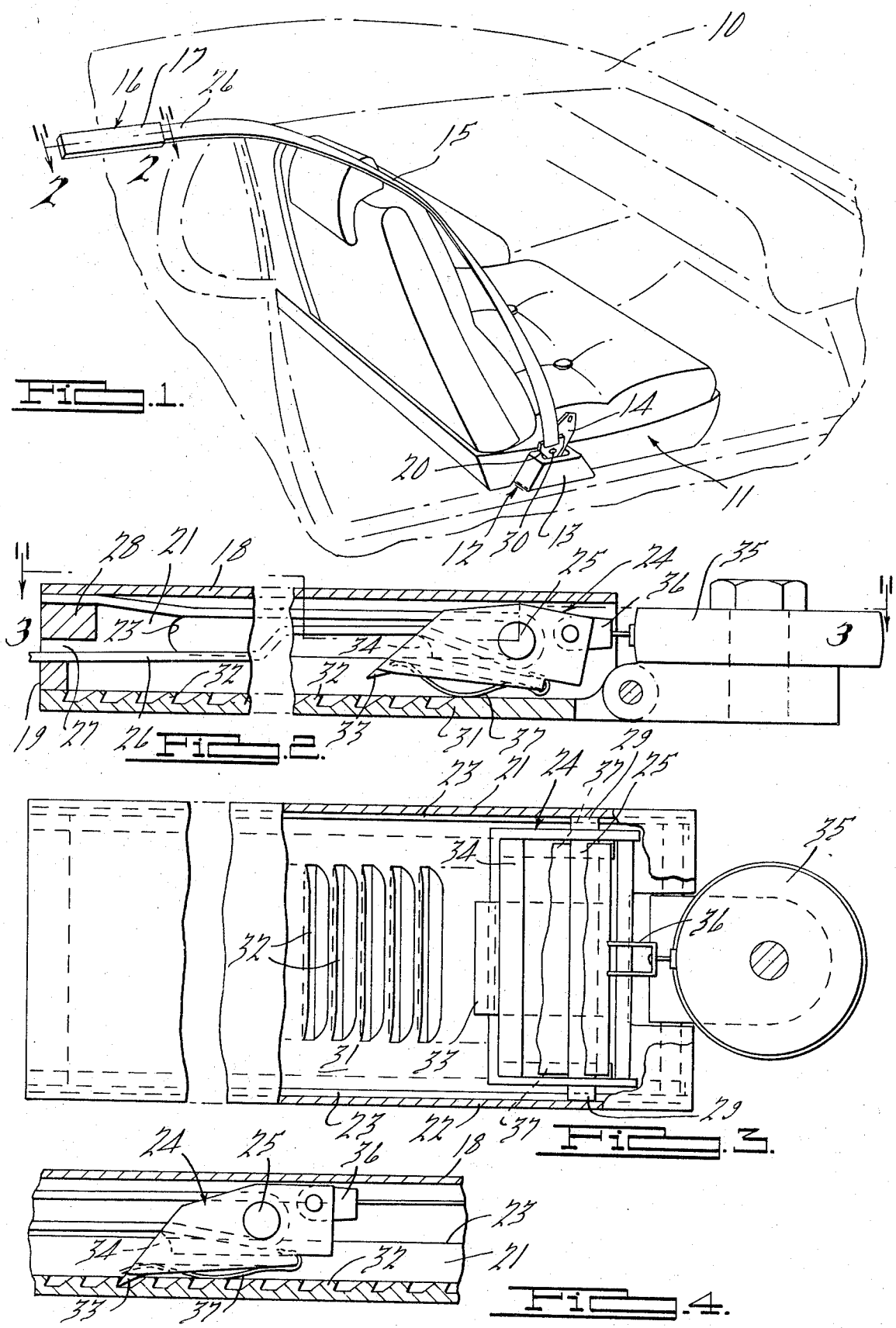

LINEAR RETRACTOR

BACKGROUND OF THE INVENTION

Current automotive design standards for vehicle occupant restraint systems require a seat belt system having a lap belt and a shoulder harness in a "must wear" configuration. That is, if the lap belt is worn, the shoulder harness also must be worn. It is desirable that the shoulder harness segment have little restraining effect on the seat occupant during normal vehicle operating conditions so that substantial freedom of movement is permitted. The occupant may then reach and manipulate the instrument panel mounted devices such as the light and windshield wiper switches, radio controls, heater and air conditioner controls and the like.

To permit such freedom of movement, the harness segment is coupled to a retractor which may be a reel type or a linear type. Such retractors are constructed and arranged to permit free protraction and retraction of the harness segment under normal vehicle operating conditions. Depending on its internal mechanism, the retractor may be responsive to a sudden deceleration of the vehicle or to a sudden protraction acceleration force on the harness segment to lock the harness segment against protraction thereby restraining the seat occupant in the vehicle seat.

The present invention relates to a linear type retractor such as disclosed in U.S. Pat. No. 3,592,507 issued to E. R. Gionet on July 13, 1971 for "Restraint Belt Lock." Linear retractors have the advantage that they are relatively flat and may be concealed within the vehicle roof structure or in the vehicle seat back structure much more readily than the reel type retractor which has a bulky configuration.

It is an object of the present invention to provide a linear retractor having a simple and positive acting arresting device for holding the shoulder harness segment against protraction upon the application of a sudden protraction acceleration force resulting from vehicle deceleration caused by a collision with another vehicle or a stationary object.

SUMMARY OF THE INVENTION

The present invention relates to a linear retractor for a shoulder harness segment of a vehicle belt system. The retractor has an elongated housing of substantially rectangular cross section. Track or guide means are associated with opposite sides of the housing. Within the housing is an arresting device carried on a cross shaft. An anchor means fixes one end of the segment to the housing with the segment extending longitudinally within the housing from the anchor means to and around the arresting device cross shaft and exiting the housing in proximity to the anchored end of the segment. The cross shaft supporting the arresting device extends laterally of the housing into engagement with the track means to support the arresting device for tilting movement within the housing and for movement longitudinally of the housing from a segment retracted position to a protracted position.

The housing has a plurality of lateral serrations extending longitudinally thereof and the arresting device has detent means at one lateral end edge position for engagement with the serrations to hold the arresting device against movement longitudinally of the housing in harness segment protracting direction. The arresting device has a cam means over which the segment passes, the cam means deflecting the segment from a straight line relation between its point of departure from the cross shaft and its point of departure from the housing.

In operation, a sudden protraction of the segment causes the latter to be pulled taut and to apply pressure through the cam means to tilt the arresting device in a direction to engage its detent means with the serrations to lock the segment against protraction thereby to restrain a harnessed seat occupant against movement out of the seat. Spring means normally urges the arresting device and segment toward retracted position, the spring means providing minimal resistance to protraction of the segment in serration disengaged position of the arresting device.

DESCRIPTION OF THE DRAWING

Further features and advantages of the present invention will be made more apparent as this description proceeds, reference being had to the accompanying drawings, wherein:

FIG. 1 is a partial view of the interior of a motor vehicle having a vehicle seat belt system incorporating a linear retractor according to the present invention;

FIG. 2 is a cross-sectional view of the linear retractor taken on the line 2—2 of FIG. 1;

FIG. 3 is a cross-sectional view on the line 3—3 of FIG. 2; and

FIG. 4 is a view in part similar to FIG. 2 illustrating the arresting device of the linear retractor in arrested position.

DETAILED DESCRIPTION OF THE INVENTION

Referring now to the drawing and particularly to FIG. 1, the numeral 10 denotes a portion of a vehicle body having a seat structure 11 therein. Associated with the seat structure is a vehicle seat belt system 12, only a portion of which is visible.

The seat belt system 12 comprises a lap belt segment which is contained within the housing 13 of a floor mounted reel type retractor (not visible). The lap belt segment terminates at its free end in a tongue element 14 adapted to engage a buckle element (not shown) in a conventional manner, the buckle element being coupled to the free end of a short, fixed length, belt segment (not visible) anchored to the vehicle floor centrally of the sheet 11.

The seat belt system also has a shoulder harness segment 15 which extends from the buckle tongue 14 to the roof of the vehicle with its upper end being housed in the linear retractor, generally designated 16, embodying the present invention.

The lower end of the shoulder harness segment is coupled to a plate member 20 which is permanently fixed to the tongue element 14 by a pivot stud 30. With this arrangement, the shoulder harness segment 15 must be worn when the lap belt segment is worn. In current model vehicles failure of the seat occupant to fasten the seat belt system causes a buzzer to sound, a light to flash on and off, or, through an ignition interlock system, prevents starting of the vehicle engine.

The linear retractor 16 is of the type that permits the seat occupant to have freedom of movement toward the vehicle instrument panel such as when it is desired to reach an ash tray, radio control knobs, heater and air conditioner controls or the like. The retractor further functions to prevent protraction of the harness under adverse conditions such as occurs upon a "panic stop"

application of the vehicle brakes or upon impact of the vehicle with a fixed barrier or approaching vehicle.

The linear retractor 16 comprises an elongated housing 17 of substantially rectangular cross section. The housing 16 is adapted to be mounted within the headlining material of the vehicle passenger compartment with the side 18, the upper side in FIG. 2, against the roof panel and the end 19, the left end in FIG. 2, facing forwardly. The opposite vertical side walls 21 and 22 of the housing 13 have opposed, longitudinally extending, grooves 23 adapted to function as track or guide means for an arresting device, generally designated 24, supported on a cross shaft 25.

The shoulder harness segment 15 upper end portion 26 passes through an opening 27 in the end wall 19 of the housing 13 and around the cross shaft 25 to an anchor or clamping means 28 in proximity to the end wall 19.

The ends 29 of the cross shaft 25 project laterally and outwardly of the arresting device 24 into engagement with the grooves 23 to support the arresting device for tilting movement within the housing 13 and for movement longitudinally of the housing from harness segment retracted position shown in FIG. 2 to a harness protracted position.

The base wall 31, i.e., the wall opposite the upper wall 18, has a plurality of lateral serrations 32 extending longitudinally of the housing 13. The arresting device 24 has a detent means 33 at its front lateral edge positioned for engagement, under certain conditions of operation as will be explained, with the serrations 32 to hold the arresting device 24 against movement longitudinally of the housing 13 in segment protracting direction.

The arresting device 24 has above its detent means 33 a cam means 34 over which the section of the belt segment between the opening 27 and the cross shaft 25 passes, the cam means 34 deflecting the segment from a straight line relation between its point of departure from the cross shaft 25 and its point of departure from the housing 13.

The arresting device 24 is under the influence of spring means urging it to the retracted, non-serration engaging position shown in FIG. 2. One spring means is a cable reel 35 mounted on the end 36 of the housing 13 and coupled at 36 to the arresting device above the pivot axis of the cross shaft 25. The cable reel 35 exerts sufficient force to hold the arresting device in its retracted position while yielding to permit protraction of the harness segment as the harness is buckled about the seat occupant and as the seat occupant moves in the seat during operation of the vehicle.

Positioned beneath the arresting device are one or more arcuate leaf springs 37, there preferably being one spring located at each side of the arresting device. The springs 37 are situated to exert a lift force on the front end of the arresting device 24 forward of the axis of the cross shaft thus urging the arresting device in a clockwise direction, as viewed in the drawing. The effect is to lift and hold the arresting device detent means 33 out of engagement with the serrations.

OPERATION

The linear retractor 16 readily permits protraction of the shoulder harness 15 so that the belt system 12 can be buckled about a seat 11 occupant. It also permits protraction and retraction movements to accommodate fore and aft movements of the seat occupant. The arresting device 24 freely moves back and forth in the housing 13 until such time as a sudden protraction force is exerted on the shoulder harness. Such protraction force occurs when the vehicle brakes are suddenly applied under "panic stop" conditions or when the vehicle impacts another vehicle or barrier. The sudden jerk on the shoulder harness segment results in segment section 26 being pulled taut faster than the inertia of the arresting device 24 and cable reel 35 permits the latter to move in protraction direction. As the segment section 26 becomes taut, it exerts sufficient downward force on the surface of the cam means 34 to drive the arresting device 24 in a counterclockwise direction against the resistance of the springs 37. The detent means 33 on the arresting device 24 is caused to engage a serration 32 as shown in FIG. 4 thus locking the arresting device 24 and thereby the harness 15 against movement in a protraction direction.

As soon as the forward momentum of the seat occupant is dissipated, the tension in the harness 15 will slacken and the springs will restore the arresting device 24 to its nonrotated position as it moves in harness retracting direction. The linear retractor then is free to function normally, that is, with minimal restraint effect on the seat occupant.

It is to be understood this invention is not limited to the exact construction illustrated and described above, but that various changes and modifications may be made without departing from the spirit and scope of the invention as defined by the following claims:

I claim:

1. A linear retractor for a shoulder harness segment of a vehicle seat belt system, having:
   an elongated housing of substantially rectangular cross section having opposite side walls and a base wall,
   track means on the opposite side walls of the housing,
   an arresting device supported on a cross shaft,
   anchor means fixing one end of the segment to the housing with the segment extending longitudinally within the housing from the anchor means to a position over and around the arresting device cross shaft and exiting the housing in proximity to its anchored end,
   the cross shaft having its ends extending laterally of the arresting device into engagement with the track means to support the arresting device for tilting movement within the housing and for movement longitudinally of the housing from a segment retracted position to a protracted position,
   the housing having a plurality of lateral serrations in the base wall extending longitudinally thereof,
   the arresting device having detent means at one lateral end edge positioned for engagement with the housing serrations to hold the arresting device against movement longitudinally of the housing in segment protracting direction,
   wherein the improvement comprises:
   cam means on the arresting device adjacent the detent means over which the segment passes,
   the cam means in slack condition of the segment deflecting the segment from a straight line relation between its point of departure beneath the cross shaft and its point of departure from the housing,
   a sudden protraction movement of the segment causing the latter to be pulled taut and to apply pressure on the cam means to tilt the arresting device toward the base to engage its detent means with the serrations thereby to lock the segment against protraction thereby to restrain a harnessed seat occupant against forward movement, a first spring means normally urging the arresting device and segment away from the housing base toward retracted position, and a second spring means providing minimal resistance to protraction of the segment in serration disengaged position of the arresting device.

2. A linear retractor according to claim 1, in which: the second spring means comprises a spring-loaded cable reel mounted at one end of the housing and coupled to the arresting device.

3. A linear retractor according to claim 1, in which: the first spring means includes at least one leaf spring member between the arresting device and housing yieldably urging the arresting device toward disengaged position relative to the serrations.

4. A linear retractor according to claim 1, in which: the first spring means comprises at least one leaf spring acting between the arresting device and housing to yieldably urge the arresting device toward disengaged position relative to the serrations, and the second spring means comprises a spring-loaded reel coupled to the arresting device.

5. A linear retractor according to claim 1, in which: the cam means extends across the width of the arresting device.

6. A linear retractor according to claim 5, in which: the first spring means comprises at least one leaf spring acting between the latch device and housing to yieldably urge the arresting device toward unlatched position.

7. A linear retractor for a shoulder harness segment of a vehicle seat belt system, having:
 an elongated housing of substantially rectangular cross section,
 a segment movement arresting device supported on a shaft extending laterally of the housing,
 the shaft having its end projecting outwardly of the arresting device into engagement with guide means in side walls of the housing,
 the shaft ends journalling the arresting device for tilting movement about the shaft axis and for longitudinal movement within the housing along the guide means from a segment retracted to a segment protracted position,
 the shoulder harness segment being anchored at one end relative to the housing and being threaded over and around to the underside of the cross shaft and exiting the housing at one end of the latter,
 coacting detent and ratchet means on the arresting device and housing,
 cam means on the arresting device over which the section of the segment between the cross shaft and the the one end of the housing passes,
 a sudden protraction movement of the segment causing the latter to be pulled taut and to apply an arresting device tilt force through the cam means,
 the coacting detent and ratchet means becoming operative upon the arresting device being tilted to hold the segment against protraction,
 and spring means normally urging the arresting device and segment toward retracted position.

8. A linear retractor according to claim 7, in which: the spring means includes at least one leaf spring member between the arresting device and housing yieldably urging the arresting device toward detent and ratchet means disengaged relationship.

9. A linear retractor according to claim 7, in which: the spring means comprises a spring-loaded reel coupled to the arresting device,
 and at least one leaf spring acting between the arresting device and housing yieldably urges the arresting device toward detent and ratchet means inoperative relationship.

* * * * *